United States Patent [19]
Despain

[11] 3,919,689
[45] Nov. 11, 1975

[54] VEHICLE SPEED INDICATOR SYSTEM
[75] Inventor: James E. Despain, Mentor, Ohio
[73] Assignee: Towmotor Corporation, Mentor, Ohio
[22] Filed: June 3, 1974
[21] Appl. No.: 475,847

[52] U.S. Cl. .......... 340/62; 340/87; 340/263; 180/106
[51] Int. Cl.² .......................... B60Q 1/26
[58] Field of Search ........... 340/22, 62, 66, 87, 94, 340/263; 180/105 R, 105 E, 106

[56] References Cited
UNITED STATES PATENTS
| | | | |
|---|---|---|---|
| 3,550,076 | 12/1970 | Kent | 340/62 X |
| 3,639,896 | 2/1972 | Bozoian | 340/62 |
| 3,750,128 | 7/1973 | Sapir | 340/263 |

Primary Examiner—Alvin H. Waring
Attorney, Agent, or Firm—Phillips, Moore, Weissenberger Lempio & Strabala

[57] ABSTRACT

A series of differently colored lights are attached to a fork lift truck or the like to indicate the speed of the vehicle to bystanders as well as to the operator. A magnetic sensing device is disposed adjacent a toothed gear in the vehicle drive train to produce electrical pulses at a rate dependent on speed and a compact solid state circuit analyzes pulse rate to actuate a different colored light at each of a series of progressively higher speed ranges. Portions of the route along which the vehicle travels may be marked with matching colors indicative of maximum safe speed so that it is immediately apparent if a vehicle is being operated in an unsafe manner.

3 Claims, 3 Drawing Figures

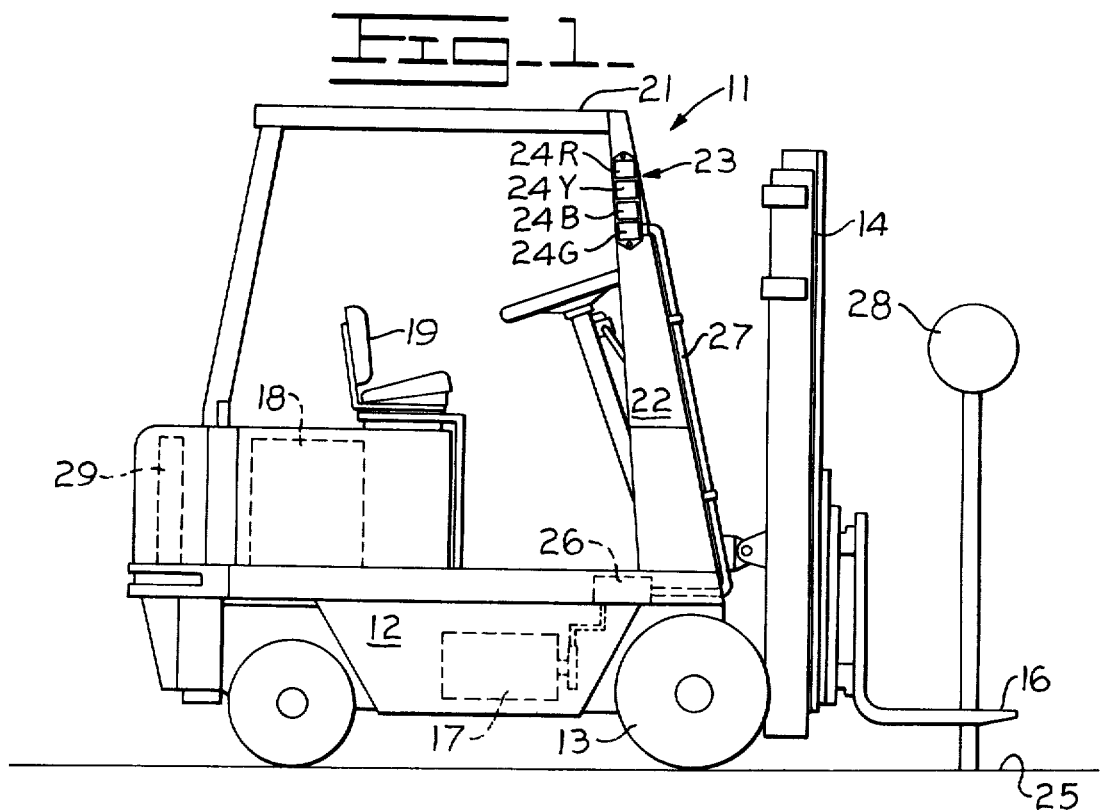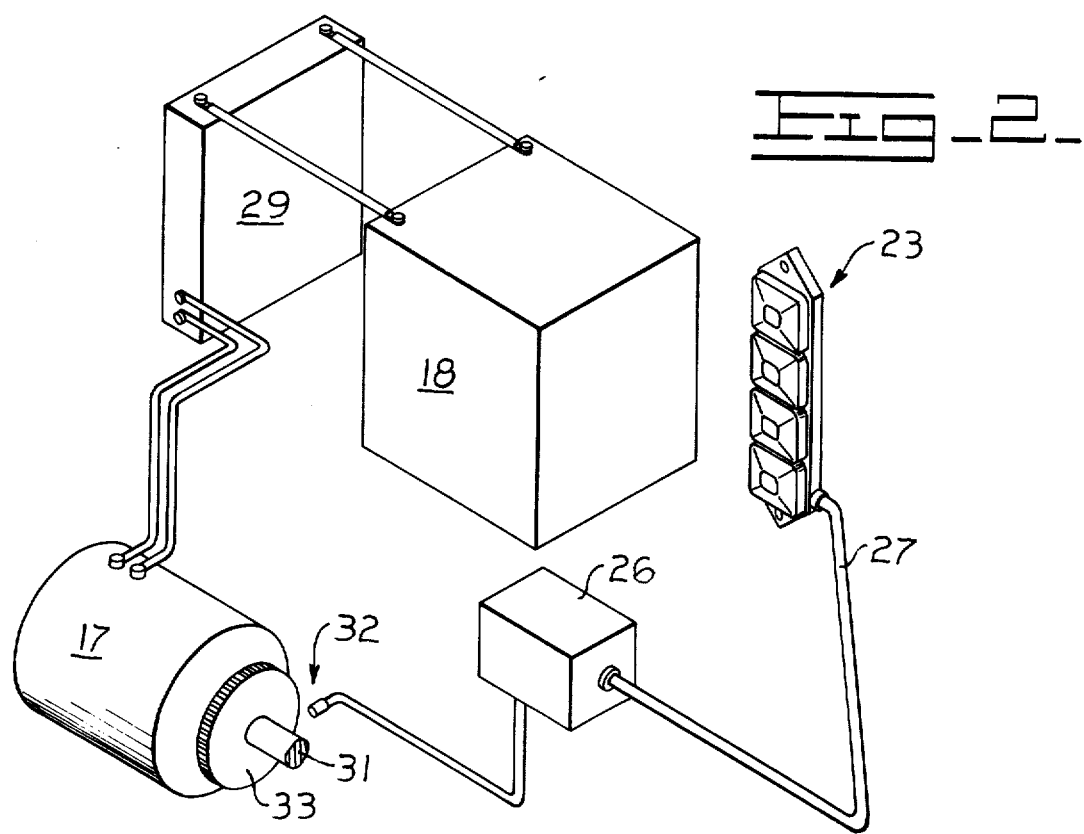

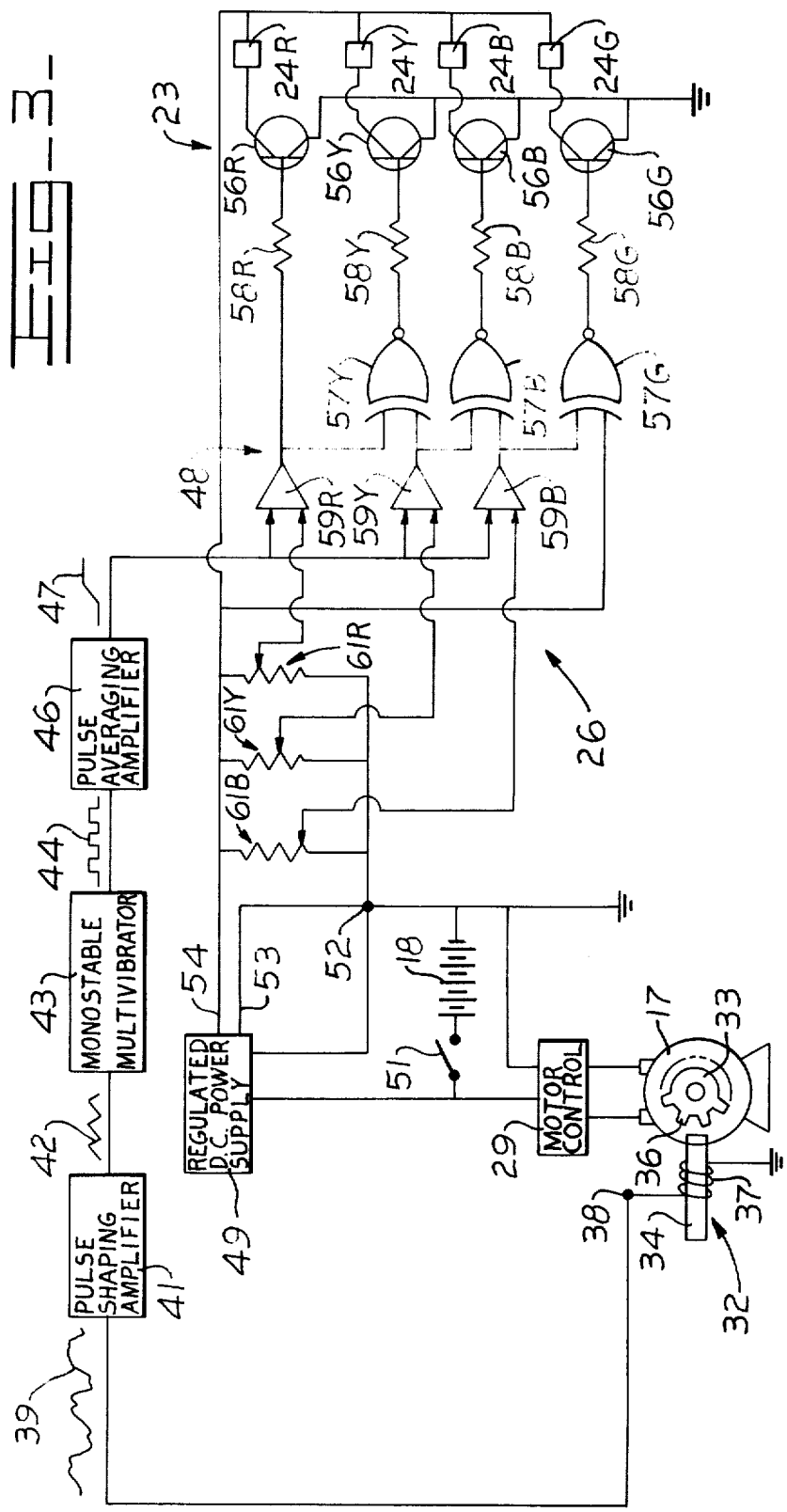

VEHICLE SPEED INDICATOR SYSTEM

BACKGROUND OF THE INVENTION

This invention relates to speed-indicating systems for vehicles and more particularly to systems for indicating approximate vehicle speed to bystanders.

Certain types of load-manipulating vehicle, of which an industrial lift truck is a typical example, are usually repetitively maneuvered along a particular route. The route may be constricted and other vehicles, workmen or other persons may be frequently encountered. To avoid accidents, the vehicle operator must pay careful attention to vehicle speed and this is complicated in that the maximum safe speed may differ widely at different regions of the working area.

As the operator must pay careful attention to the load being carried on a lift truck as well as to the route over which he is traveling, conventional speedometer instruments are of little use on such vehicles and are often not present. Frequent observation of a conventional speedometer requires a diversion of the operator's attention, which may itself be hazardous. Accordingly, it has heretofore been necessary to rely simply on the perception and judgment of the operator for the purpose of avoiding accidents. This is not always a fully reliable technique as some operators may on occasion be careless, distracted or may lack the necessary experience at vehicle-handling. An undesirably high accident rate is sometimes associated with industrial operations involving low speed working vehicles such as lift trucks which must be maneuvered within constricted and sometimes crowded areas.

In conjunction with highway vehicles such as automobiles, trucks, motorcycles and the like, which customarily travel at relatively high speeds, it has heretofore been proposed to equip the vehicle with a series of speed indicator lights visible to bystanders as well as to the operator which can be compared with colored markings disposed along the route of travel to make it apparent if the vehicle is being operated at an excessive speed. Prior U.S. Pat. Nos. 2,251,623 and 3,550,076 describe typical systems of this kind.

These prior speed-indicating systems are not well adapted for use with relatively low-speed working vehicles such as lift trucks. In these prior systems electrical speed signals are obtained from modified conventional speedometers or speedometer-like mechanisms. As pointed out above, many low-speed working vehicles do not employ speedometers. If speedometer mechanisms are installed and provided with switches, sliding contacts or the like, for producing an electrical signal indicative of speed range, the necessary mechanism is mechanically complex and subject to problems from contact wear, arcing, and a need for frequent adjustment of delicate contacts which are prone to malfunction under sustained heavy usage.

While circuits for producing an electrical signal indicative of rotary speed without requiring a delicate complex speedometer-like mechanism have heretofore been developed, as typified by prior U.S. Pat. Nos. 3,420,328, 3,560,854 and 3,714,509 for example, these mechanically simpler and more reliable means have not heretofore been applied to external indicator systems for low-speed working vehicles and have not been of a form particularly adapted for such purposes.

In the absence of a practical means for quickly alerting both observers and the operators of low-speed working vehicles of unsafe operating conditions, accidents occur with undesirable frequency and, at best, the task of the operator is undesirably complicated.

SUMMARY OF THE INVENTION

This invention provides a system for quickly and reliably alerting bystanders when a low-speed working vehicle is traveling at an excessive speed for a particular area of travel.

Electrical pulses having a repetition rate indicative of vehicle speed are obtained from a rotating toothed gear in the vehicle drive train through a magnetic sensing unit that requires no other moving parts and which need not contact the rotating gear. A compact, preferably unitized solid state circuit analyzes the electrical pulses and actuates an appropriate one of a series of differently colored lights mounted on the vehicle in a position to be observable by bystanders and preferably by the operator as well, each color of light being indicative of a predetermined speed range. The working area through which the vehicle is customarily traveled may be posted with colored markers or colored guidelines so that observers may determine immediately and unequivocally if the vehicle is being operated at a speed which is unsafe for the particular area.

Accordingly, it is an object of this invention to enhance safety in connection with low-speed working vehicles which may be operated in constricted areas.

It is another object of the invention to provide a more compact, efficient and reliable speed-indicating system for a low-speed working vehicle which indicates vehicle speed to observers as well as to the operator for comparison with preferred speed coding symbols disposed along the route of vehicle travel.

The invention, together with further objects and advantages thereof, will best be understood by reference to the following description of a preferred embodiment taken in conjunction with the accompanying drawings.

BRIEF DESCRIPTION OF THE DRAWINGS

In the accompanying drawings:

FIG. 1 is a side view of an industrial lift truck having the invention installed thereon, FIG. 2 is a perspective view of certain electrical components of the lift truck of FIG. 1 and of the speed indicator system, and FIG. 3 is a circuit diagram of the speed-indicating system of FIGS. 1 and 2.

DESCRIPTION OF A PREFERRED EMBODIMENT

Referring initially to FIG. 1 of the drawings, the invention is shown installed on industrial lift truck 11 of the form having a body 12 riding on wheels 13 and having a tiltable mast structure 14 at the front end with forwardly directed forks 16 which may be selectively raised and lowered to receive and manipulate loads which are usually supported on a pallet. Lift truck 11 in this example is of the form powered by an electrical motor 17. Motor 17 is operated from storage batteries 18 carried on the vehicle and has an operator's seat 19 and an overhead safety guard 21 supported on posts 22 which extend upwardly from the forward portion of the body 12. Aside from the speed-indicating system of the present invention, lift truck 11 may be of the conventional construction well known to those skilled in the art and accordingly will not be further described herein.

The speed of lift truck 11 is visibly indicated by means of a lamp assembly 23 positioned on the vehicle where it may be seen by the operator and by other persons situated outside the vehicle. In this example, lamp assembly 23 is mounted on the side surface of one of the upright posts 22 which support overhead guard 21, although it will be apparent that the assembly may be mounted at other positions where the configuration of the vehicle makes that necessary. If it is desired that the speed-indication be visible from all sides of the vehicle, one or more additional parallel connected lamp assemblies 23 may be situated at other points on the vehicle. Assembly 23 is provided with four different colored lamps 24G, 24B, 24Y and 24R to respectively produce green, blue, yellow, and red light when electrically energized. An indicator control circuit assembly 26, to be hereinafter described in more detail, is coupled to lamp assembly 23 through a multi-conductor cable 27 extending upwardly on post 22 and acts to energize a different predetermined one of the lamps 24 according to the speed at which the lift truck is traveled.

In order that it may be quickly determined at any time if the vehicle is being traveled at a proper speed, the various areas through which the vehicle is customarily operated may be marked with colors which indicate preferred speed for that particular area and which correspond to the several colors of the lamp assembly 23. Such markings may be done by various means. The floor or road surface 25 may be painted in whole or in part with a color corresponding to the preferred speed or sign posts 28, flags or the like may be provided at various points and may be colored in accordance with the preferred operating speed in the immediate region. In the present example, green indicator lamp 24G of the lift truck is lighted at a vehicle speed up to five miles per hour, blue indicator lamp 24B is lighted from five to seven miles per hour, yellow indicator lamp 24Y is lighted from seven to nine miles per hour while red lamp 24R is lighted from nine miles per hour up to the maximum speed, which is twelve miles per hour in this particular vehicle. Thus, if floor marking 25 or sign post 28 is colored blue and the yellow indicator lamp 24Y of the vehicle is observed to be lighted, it is immediately apparent that the operator is traveling the vehicle at an excessive and unsafe speed.

Considering now the control means for lighting the appropriate one of the lamps 24 in accordance with vehicle speed, reference should be made initially to FIG. 2. As previously pointed out, the vehicle of this example is powered by an electrical motor 17 which draws current from storage batteries 18, a conventional motor control circuit and assembly 29 being connected between the motor and the battery. The motor is provided with the customary drive shaft 31 for transmitting power to the vehicle wheels and the speed indicator system of the present invention detects vehicle speed by sensing the rotational speed of the shaft through a magnetic sensing unit 32. Sensing unit 32, to be hereinafter described in more detail, is situated in proximity to a toothed gear 33 which rotates with the motor and drive shaft and which is formed of a ferromagnetic material such as steel. Gear 33 may be specifically mounted on shaft 31 for this purpose or use may be made of a pre-existing gear in the vehicle drive train. It should be observed that the magnetic pickup unit 32 need not actually contact gear 33.

Referring now to FIG. 3, the magnetic sensing unit 32 may typically consist of a permanent magnet 34 having one end adjacent the teeth 36 of rotating gear 33 whereby the magnetic field of the magnet is cyclicly and repetitively disturbed by the passage of each tooth. A coil 37 is disposed coaxially around magnet 34 and has one end grounded while the other end connects with a signal output terminal 38. As gear 33 rotates and the field of magnet 34 is cyclicly disturbed by the passage of teeth 36 the magnetic field movement induces a voltage in coil 37 which causes a cyclical electrical wave form 39 to be present at output terminal 38, the frequency of the output signal being a function of the rotational speed of gear 33 and thus being a function of vehicle speed.

As the output wave form 39 from sensing unit 32 tends to be of somewhat irregular shape and may have a varying amplitude depending on vehicle speed, output terminal 38 is coupled to the input of a pulse-shaping amplifier 41 to convert the irregular wave form to a series of narrow pulses 42 of uniform shape and amplitude that are more suitable for serving as trigger pulses for a monostable multivibrator 43. The output of monostable multivibrator 43 is a wave form 44 of uniformly shaped square pulses which have a uniform duration as determined by the multivibrator circuit constants in the manner known to the art. Thus the output from multivibrator 43 varies only in repetition rate as determined by the rotational speed of gear 33.

The output of multivibrator 43 is transmitted to a pulse averaging amplifier 46 of the form which produces a DC output signal 47 which has a magnitude at any instant proportional to the rate at which the input pulses 44 are being received. Thus the output wave form 47 as depicted in FIG. 3 for purposes of example would indicate that the vehicle has traveled at a uniform rate and was then accelerated to a higher speed and is now being held constant at that higher speed. Accordingly, the output of averaging amplifier 46 is a DC voltage, the magnitude of which is at any given instant indicative of the present speed of the vehicle. This signal is transmitted to a logic circuit 48, to be hereinafter described in more detail, to light the appropriate one of the indicator lamps 24.

To provide current for energizing the lamps 24 and the logic circuit 48, a regulated DC power supply 49 has input conductors connected across the vehicle battery 18 through an on-off switch 51 with one input being coupled to a ground terminal 52. One of the output conductors 53 of regulated DC power supply 49 is also connected to ground terminal 52 while the other output conductor 54, at which a constant voltage is provided, is connected with one side of each of the indicator lamps 24. The other sides of the indicator lamps 24G, 24B, 24Y and 24R are connected to ground through the emitter collector circuits of transistors 56G, 56B, 56Y and 56R respectively. Thus, any individual one of the indicator lamps 24 will be lighted if the associated individual one of the transistors 56 is biased into conduction.

Considering now the logic circuit 48 which controls the transistors 56 in accordance with the speed signal from amplifier 46 to light an appropriate one of the lamps 24 at any given time, three EXCLUSIVE OR gates 57G, 57B and 57Y have outputs coupled to the bases of transistors 56G, 56B and 56Y respectively through base resistors 58G, 58B and 58Y respectively.

The base of transistor 56R is coupled to the output of a comparator 59R through a base resistor 58R. The output of comparator 59R is also coupled to one input of EXCLUSIVE OR gate 57Y. An additional comparator 59Y has an output coupled to the other input of EXCLUSIVE OR gate 57Y and also to one input of EXCLUSIVE OR gate 57B. Still another comparator 59B has an output coupled to the other input of EXCLUSIVE OR gate 57B and to one input of EXCLUSIVE OR gate 57G. The remaining input of EXCLUSIVE OR gate 57G is coupled to the output conductor 54 of regulated power supply 49.

One input of each of the comparators 59 is coupled to the output of averaging amplifier 46 to receive the DC signal which is proportional to vehicle speed. The other inputs of comparators 59B, 59Y and 59R are coupled to the adjustable taps of three potentiometers 61B, 61Y and 61R respectively, each of the potentiometers having a resistive element connected between regulated power supply output conductor 54 and ground terminal 52.

In accordance with the known operation of comparators, any individual one of the comparators 59 will produce an ouput signal when the DC signal received from amplifier 46 reaches a magnitude equaling or exceeding the reference voltage applied from the associated potentiometer 61. The potentiometers 61B, 61Y and 61R are adjusted to supply progressively higher reference voltages to comparators 59B, 59Y and 59R respectively so that each comparator produces an output signal only after three different vehicle speeds are reached or exceeded.

In operation, with the vehicle initially stationary, only indicator lamp 24G will be lighted as none of the comparators 59 are producing an output signal under that condition. Lamp 24G is lighted since in accordance with the known operation of the EXCLUSIVE OR gates, an output signal is present at the output of EXCLUSIVE OR gate 57G as one input thereof is energized while the other is not. Such output biases transistor 56G into conduction to light lamp 24G. As no signal is present at either input of EXCLUSIVE OR gates 57B and 57Y, nor at the output of comparator 59R, lamps 24B, 24Y and 24R are energized.

If the vehice speed then begins to increase, a point is reached where the speed signal delivered to one input of comparator 59B reaches a magnitude equaling the reference voltage received at the other input of that comparator and an output signal is then delivered to one input of both EXCLUSIVE OR gates 57G and 57B. As both inputs to EXCLUSIVE OR gate 57G are now energized, the output signal therefrom terminates, turning off transistor 56G and extinguishing the green lamp 24G. At the same time, one input to EXCLUSIVE OR gate 57B has now been energized while the other input is not and an output signal is therefore produced by EXCLUSIVE OR gate to bias transistor 56B into conduction and thereby light the blue lamp 24B.

After vehicle speed has increased still further, the DC speed signal supplied to one input of comparator 59Y reaches a value equal to the reference voltage supplied to the other input from potentiometer 61Y and an output signal is produced by comparator 59Y. As both inputs of EXCLUSIVE OR gate 57B are now energized, the output signal is terminated, thereby removing base bias from transistor 56B to extinguish the blue lamp 24B. At the same time, one input only of EXCLUSIVE OR gate 57Y is energized and an output signal is produced to bias the transistor 56Y into conduction causing the yellow lamp 24Y to be energized.

When the vehicle speed has increased still further, the speed signal voltage received by comparator 59R reaches a level equaling the reference voltage supplied thereto from potentiometer 61R and the resulting comparator output signal balances the two inputs of EXCLUSIVE OR gate 57Y. The output signal from EXCLUSIVE OR gate 57Y terminates, removing base bias from transistor 56Y to extinguish yellow lamp 24Y. The output from comparator 59R also provides base bias to transistor 56R, causing the red lamp 24R to be energized.

As vehicle speed decreases, a reverse sequence of operation occurs in which lamps 24R, 24Y, 24B and 24G are successively energized and extinguished according to vehicle speed.

As will be apparent from the above description of operation of the circuit, the particular speed range at which any particular one of the lamps 24 is energized may be adjusted by adjustment of the potentiometers 61 with the exception of the green lamp 24G which will be energized only at the lowest speed range.

While the invention has been described with respect to a particular embodiment, it will be apparent that modifications are possible and it is not intended to limit the invention except as defined in the following claims.

What is claimed is:

1. In combination with an industrial lift truck vehicle which is to be driven along a predetermined route wherein different maximum safe speeds exist at different portions of said route, a speed-indicating system for said vehicle comprising:

a plurality of electrical lamps each producing a different colored light;

means for attaching said plurality of lamps on said vehicle in position to be observable from viewpoints outside said vehicle;

means for magnetically sensing rotation of a rotary element coupled to the drive system of said vehicle and for producing a DC signal having a magnitude which is a function of the rotary speed of said element, wherein said rotary element of said vehicle is a gear having teeth thereon and which is formed of ferromagnetic material and wherein said means for magnetically sensing rotation of said element comprises a magnet having an end situated adjacent the path of travel of said teeth of said element and having an electrical coil disposed in the magnetic field of said magnet to produce electrical pulses having a repetition rate which is a function of the speed of said element, said coil being coupled to means for averaging said electrical pulses to produce said DC signal, circuit means for detecting when said DC signal reaches each of a plurality of different magnitude ranges and for energizing different colored ones of said lamps when said DC signal is within different ones of said magnitude ranges each of said DC signal magnitude ranges having an end point corresponding to a separate one of said maximum safe speeds to light a different one of said lamps as speed rises above each of said maximum safe speeds, and indicator means disposed at least at intervals along said predetermined route of travel and being colored to indicate the maximum safe speed range of the adjacent portion of said route, the color of said indicator means corresponding to the color of the one of said lamps which is lighted as said lift truck reaches said maximum safe speed range.

2. The combination defined in claim 1 wherein said industrial lift truck vehicle has an overhead guard structure above the operator's compartment including upwardly extending overhead guard supporting posts at each side of said vehicle and forward fom said operator's compartment, and wherein said means for attaching said plurality of lamps on said vehicle secures said plurality of lamps to at least one of said upwardly extending posts thereof.

3. A speed-indicating system as defined in claim 2 wherein said lamps are mounted on said vehicle to be visible from the operator's compartment thereof as well as being visible from viewpoints outside said vehicle.

* * * * *